United States Patent Office 3,465,268
Patented Sept. 2, 1969

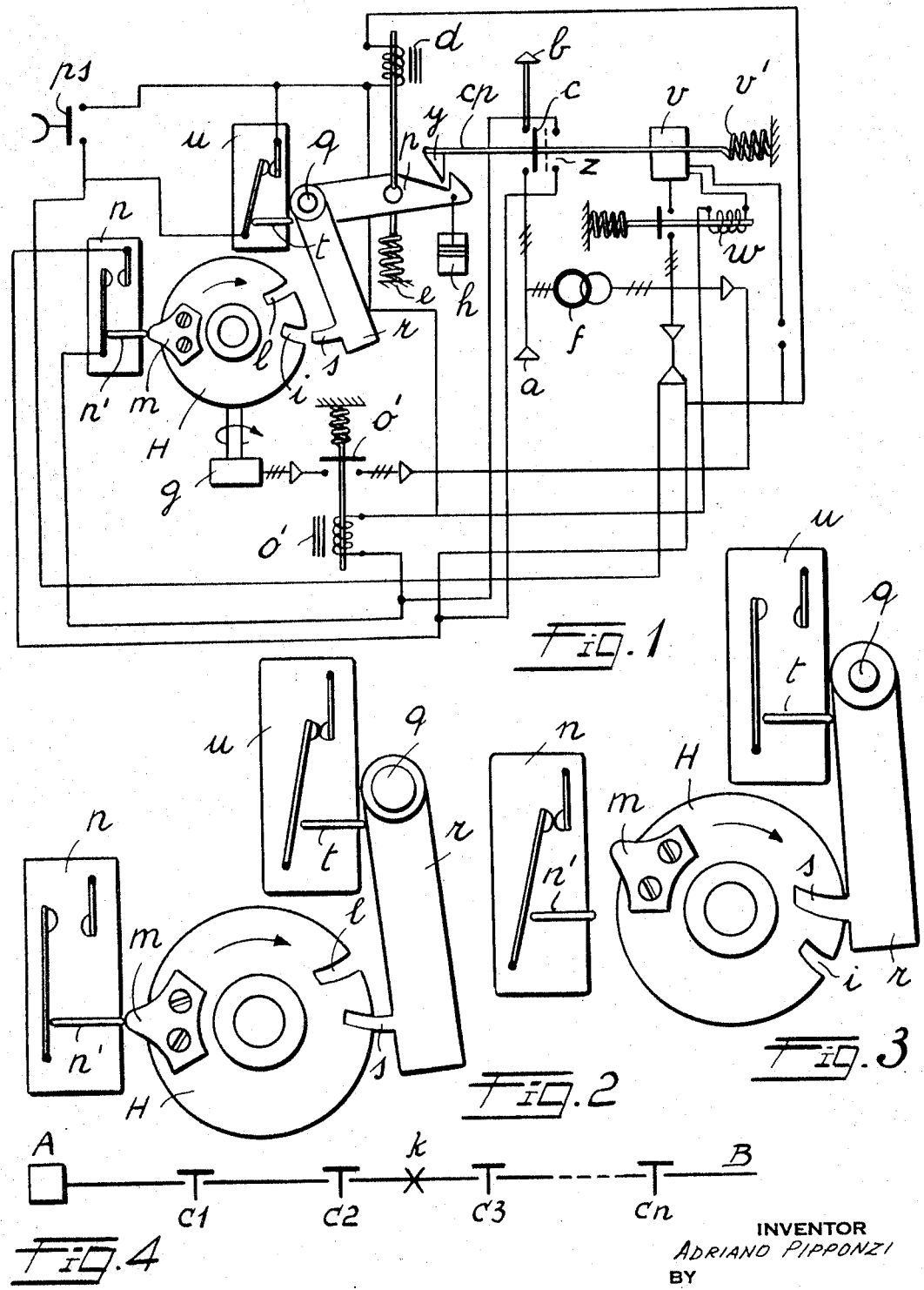

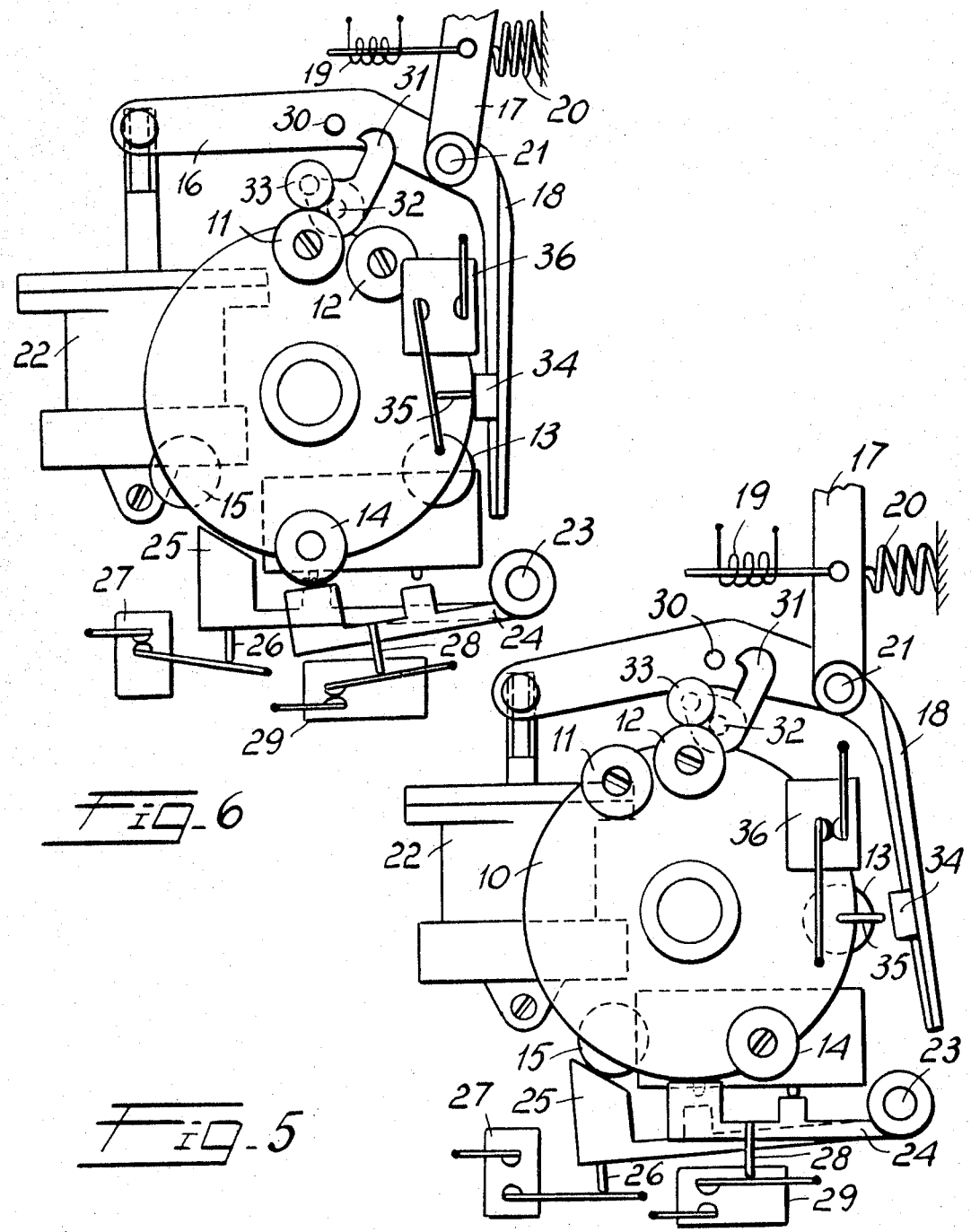

3,465,268
REMOTELY OPERATING PROGRAMMER TO LOCATE ELECTRIC LINE FAILURES
Adriano Pipponzi, Via Magenta 7, Busto Arsizio, Varese, Italy
Filed Feb. 28, 1967, Ser. No. 619,274
Claims priority, application Italy, Mar. 5, 1966, 4,927/66
Int. Cl. H01h 75/02, 77/02
U.S. Cl. 335—26                                1 Claim

ABSTRACT OF THE DISCLOSURE

A remotely operating programmer, with electric axis, especially suitable for locating remote electric line failures and for the progressive reapplication of power to systems serving particular working cycles, which includes, in combination with an automatic interrupting device, a rotating device, provided with cam means, actuated by a motor fed by a voltage proportional to that of the network, adapted to stop in predetermined different positions and cooperating with the means controlling the opening of said automatic interrupting device, said rotating device being in turn combined with auxiliary switches, connected in the circuits controlling the opening of the automatic interrupting device and the motion of said rotating device, that may allow, in connection with the position taken up by said rotating means, the opening of the interrupting device, in a way so as to be easily reclosable, or in a way to lock the different members, and therefore also the movable contacts of the interrupting device, in the open position.

---

It is well known how the problem of locating in a quick and economical way, in electric power distribution systems, the position of a failure, is of particular concern.

It is also known the need of carrying out sectioning operations in non-manned cabins or on pole, for combining the connections between the mains according to necessity, irrespective of the faults.

It is an object of the present invention to solve this problem, at least for distributing voltage lines, that may reach lengths even in excess of 10 km. and have branch lines some kilometers long.

Taking advantage of the fact that such lines have several sectioning points, it was thought to prearrange, at each line disconnecting switch, apparatus allowing to locate on which line section, comprised between a section point and the next, the failure has occurred.

The present invention therefore allows several advantages, first of all namely that of limiting the search for failure to a short length of line, leaving out of commission only said section, and therefore practically without interruption for the customers, if the circuit system is of the loop fed type. And even in radial line circuits there remain possible the immediate line feeding up to the switch ahead of the failure, while the eventual other sections, downstream to the failure, can also be promptly reconnected, if a reclosure is foreseen.

All this will allow to effect the search and to repair the failure, during normal hours, without the urgency otherwise indispensable when whole lines remain out of commission, and therefore at a minimum cost and under easy conditions, because practically all other users, except those on the line section where the failure occurred, are not suffering a power interruption.

The same device allows the remote control, as from the departure point of the line, of any one of sectioning points according to the requirements, without resorting to the use of the costly systems known in the art.

According to the present invention therefore, each disconnecting device is provided with a particular, simple and sturdy apparatus, requiring practically no servicing, inasmuch as the different devices combined with the different disconnecting switches, are actuated by three-phase or monophase motors supplied from the network power, that is without requiring other particular power sources.

However, when the sectioning points are located remote from a three-phase transformer, D.C. electric motors or mechanical energy may be used.

More exactly, according to the present invention, each disconnecting switch of the lines in a given system is combined with a disc that is caused to rotate by a reduction unit driven by a motor fed from the network itself, and on the perimeter thereof there are foreseen projections and recesses, or cams of other shape, adapted to control the position of interrupting means and switch operating levers, such as to cause the reclosing of the respective downstream switches, if upstream of same the failure that had caused the original operation of the automatic breakers, placed at the beginning of the line, has been cleared.

The remotely operating programmer system, object of the present invention, can be usefully applied in systems of other types, different from electric power distributing systems; thus, for instance, it can perfectly serve to reapply progressively power to a system serving particular working cycles, or in general, for the automation of industrial systems.

The structure, operation, advantages and features of the invention, will more clearly be apparent and evident from the following description of a form of embodiment of same, as applied in an electric power distribution line, with reference to the accompanying drawing wherein:

FIG. 1 shows diagrammatically the electromechanical apparatus, object of the present invention, that has to be combined with every disconnecting switch and/or breaker, according to the invention.

FIGS. 2 and 3 are details showing the main members of the apparatus of FIG. 1, in different characteristic positions that same can take up.

FIG. 4 shows diagrammatically an electric line with the several disconnecting switches, to which are supposed to be applied the apparatus object of the present invention.

FIGS. 5 and 6 show diagrammatically a further embodiment of the main members of the apparatus being the object of the invention.

As it can be clearly seen in FIG. 1, the apparatus combined with each disconnecting switch, for the embodiment of the present invention, includes disc H rotatable about its axis and having at its perimeter a camlike projection $m$ and two slots, of different depth, respectively designated by $i$ and $l$. Said disc is caused to rotate by a reduction gear $g$ driven by a motor fed from the network through a remotely operated switch $o$. Combined with said rotating disc there are two auxiliary switches $n$ and $u$ respectively, which through suitable means are controlled by cams, or projections and recesses, provided on disc H. The disconnecting switch C, installed on the line $a$–$b$, that is simply a short section of the electric power distribution line in which the present invention is supposed to be applied, is illustrated in FIG. 1 in a very diagrammatically way, not being per se part of the invention, while on the other side said switch can be of any suitable type. Said disconnecting switch is provided with auxiliary contacts $z$, that are closed when the main switch is open. The movable contacts of the breaker or switch C are carried, in the example shown in the drawing, on a stem $cp$, terminating at one end with a hook $y$, and provided at its other end with a reclosing control mechanism $v$, actuated by a three-phase motor controlled by relay $w$, the reclosing time of said disconnecting breaker or switch being supposed equal to $x$, a constant and same value for all the disconnecting switches C.

The line section $a$–$b$, shown in FIG. 1, is nothing but a short section of the whole line A–B, shown in FIG. 4, said section including one of the disconnecting switches that in said last figure are respectively designated with C1, C2, C3 . . . C$n$. A spring, referred to with $v'$, shows schematically the means urging the movable contact stem of switch C, to the position corresponding to the open position of the main contacts, when hook $y$ does allow it.

Said hook is normally retained in the position shown in FIG. 1, that is with the switch C closed, by a lever $p$, normally held in the position latching the hook $y$, due to the under-voltage coil $d$, while it is urged in the unlatched position by spring $e$. Said lever $p$ is also combined with a time-delay device $h$, that can be of the mechanical type, or constituted, as in the example shown, by an oil cylinder and piston, in said piston there being provided a gauged hole, or else be of the oil type with an adherence disc. Of course the calibration of this device will be such as to delay in the wanted degree the opening of the disconnecting switch C, in connection with the system requirements.

Lever $p$ is rigidly connected, through pivot pin $q$, to an arm or lever $r$, having at a point near its free end, a projection or hook $s$, adapted to fit at predetermined times, into the slots $i$ or $l$ of disc H.

In FIG. 1, $f$ designates the transformer the primary whereof is connected to the line $a$–$b$, and from the secondary whereof there is drawn the power for controlling the apparatus itself, and in particular for controlling the breaker or disconnecting switch C, and for the reduction gear $g$ motor, that causes the rotation of disc H. Disc H speed is such that the notch or recess $l$ moves to the position of slot $i$ (looking at FIG. 1) in the time $x$ predetermined for the closing.

The apparatus position now described, shown in FIG. 1, is the normal operating position. Let us suppose now that the voltage is failing in the line $a$–$b$; the undervoltage coil $d$ does not exercise a pull anymore on lever $p$ so as to hold it in the position shown, and then spring $e$ will prevail and cause, with the predetermined delay, due to the time delay device $h$, the release of lever $p$ from tooth $y$ of the movable contact of switch C. This rotation of lever $p$ has been made possible by the fact that, in the position shown in FIG. 1, notch $i$ of disc H, was in front of tooth $s$, and this tooth could thus move into said notch, allowing a sufficient rotation of the assembly of the two levers $p$ and $r$ about pivot $q$. The rotation of said levers $p$ and $r$ thus allowed will be sufficient to cause the opening of C, but not that of the auxiliary switch $u$.

As it is known, the main automatic breaker, controlling a power distribution line, will usually reclose after a short predetermined time because, if the failure was a transient one, power can very well be reapplied to the whole line and to the apparatus connected thereto. As soon as power is reapplied, at point $a$ of the line, through transformer $f$, the undervoltage coil $d$ will be energized again and lever $p$ will be attracted anew, causing also the moving of lever $p$ from the position shown in FIG. 2 to the one shown in FIG. 1. The reclosing mechanism $v$ motor will also start at once, and the reclosing of the switch C will occur with a snap action, taking a time $x$ for charging the springs.

Meanwhile, through the auxiliary contact $z$ of switch C, which was closed in the switch open position, power has been applied to the reduction gear $g$ motor, which imparts to disc H an angular displacement of such a value as to bring slot $l$ in the position of slot $i$. Cam $m$, carried by the same disc H, moving together with said disc in the direction shown, causes the closing of the auxiliary switch $n$, and thus the energizing of electromagnet $o$ coil bringing about the closing of contacts $o'$, prior to the opening of auxiliary contacts $z$ of C. Thus, when switch C recloses, as told before, at the expiration of the time delay $x$, slot $l$ of disc H will be in the position shown in FIG. 3, namely in the position that, in FIG. 1, was occupied by notch $i$; thus, in front of tooth $s$ of lever $r$ there is now slot $l$, deeper than slot $i$.

Should now the voltage fail again at point $a$, due to a failure in the line section $b$, as explained above, lever $p$ will disengage from hook $y$, and lever $r$ will perform a displacement larger than the one previously considered, since tooth $s$ will reach the bottom of the longer slot $l$; due to this greater displacement, lever $r$, through the transmission means $t$ will cause the opening of the auxiliary switch $u$. This opening will block the operation of the whole unit; in fact, upon power being reapplied at point $a$, since through the switch $u$ the energizing circuits of the auxiliary relays $o$ and $w$, and of the undervoltage coil $d$ are interrupted, the whole unit remains blocked. The system then shall have to be reset by acting on push-button $ps$.

Should instead the lack of voltage just considered above fail to materialise, disc H will continue to revolve and, should the voltage fail, after a time delay other than $x$, lever $r$ will not be in a position to perform any movement since tooth $s$, finding neither slot $i$ nor slot $l$ in front of itself, will merely rest on the periphery of disc H, the lever $p$ being thus unable to rotate to unlatch itself from tooth $y$ and allow the opening of switch C main contacts, under the action of spring $v'$. The disc H will stop when it reaches its position shown in FIG. 1.

The gear reduction motor might be substituted, utilizing mechanical means per se known, by the same motor actuating the closing mechanism $v$ of switch C. Namely one single motor would do for both purposes in this instance.

FIGS. 5 and 6 show diagrammatically another embodiment of the characteristic members of this invention, such as those illustrated in FIGS. 2 and 3.

More exactly, FIG. 5 shows the above said members in a position corresponding to that of FIG. 2, and FIG. 6 shows the same members but in a position corresponding to that of FIG. 3.

In this modification, disc H is replaced by a disc 10, cam means placed on the periphery thereof are constituted of partly protruding rollers, instead of rigid projections and notches such as indicated with $m$, $l$ and $i$ in foregoing figures. In particular, rollers 11 and 12 replace notches $i$ and $l$, whereas roller 15 replaces the protrusion $m$. The purpose of rollers 13 and 14 will be more clearly set forth hereinafter.

By numerals 16–17–18 is indicated a three-arm lever, corresponding to lever $p$–$r$ of FIG. 1, while 19 is an under-voltage coil, and 20 a return spring, corresponding to those indicated with $d$ and $e$, respectively, in FIG. 1.

Said lever is rotatable around the fixed pivot 21, whereas, at the free end of arm 16 is linked with a braking device 22, corresponding to brake $h$.

At 23 is pivoted another lever 24, the projection 25 thereof being acted on by roller 15, in order to make said lever rock and to control, through dowel 26, the auxiliary switch 27, corresponding to the switch $n$, of FIG. 1. Roller 14 instead, serves to control by means of member 28, the switch 29, inserted in the closing circuit of the sectioning apparatus and serves to bring about the closing thereof, after a predetermined time X has elapsed, even in the case the sectioning device had a loading time: of closing springs, lower than said time X.

Arm 16 of said three-arm lever is provided with a protruding dowel 30 which may be engaged by a hook 31 pivotable around a fixed pin 32 and carrying a roller 33 adapted to come to contact rollers 11 and 12, and to be moved thereby, against the bias of a spring not shown in the drawing.

Hook 31 during time periods of normal operation of the system, (position corresponding to that of FIG. 1 of other embodiment) is hooked on dowel 30.

Arm 18 of said three-way lever is provided with a projection 34 acted on by roller 13 of disc 10 when this latter rotating makes said roller engage projection 34. This projection engages a dowel 35 too, which is adapted to act on an auxiliary switch 36, corresponding to switch u of FIG. 1.

When there is a fault, coil 19 is de-energized and switch C opens owing to the rotation of lever 17 connected—through a hook not shown on the drawing—to a lever cp (see FIG. 1) carrying the main contacts c of switch C.

Then the voltage is reapplied to the whole system and disc 10 rotates so as to move roller 11 to the position of roller 12 (FIG. 6). Also roller 14 reaches the position shown in FIG. 6, where it causes the closing of the auxiliary switch 29, which controls the reclosing of the main switch C.

If the fault is a transient one, the disc 10 rotates so as to reach again the position shown in FIG. 5 and the apparatus returns in the normal operating position.

Should the fault be a permanent one, the voltage would fail again, the coil 19 is again de-energized and the lever 18 (FIG. 6) moves so that its projection 34—no longer in contact with roller 13—causes the opening of the auxiliary switch 36.

Switch 36 acts on the system as switch u of FIG. 1, and opens the auxiliary circuit fed by transformer f (FIG. 1). That is, the unit illustrated in FIGS. 5 and 6 upon operation of the auxiliary switches will operate in a way perfectly similar to the one of the mechanism shown in FIGS. 2 and 3.

All of the rollers mounted on disc 10 are placed on a side thereof and in part on the other side thereof, and at eights different also on the same side, in order to act only on the member each roller is provided to move, so as not to interfere with the members which should be moved by the other rollers.

The number of rollers placed on disc 10 and their positions may be varied to need, in order to effect through said disc other secondary controls which may be desired in any specified case.

Let us see now how operates a line, for instance line A–B, shown in FIG. 4, when its disconnecting switches C1, C2, C3 ... Cn are provided with the apparatus apparatus illustrated in the preceding figures.

The supply station is supposed to be at A, equipped with an automatic breaker tripping for each failure, such as a short-circuit, a grounded phase, and the like. Let us suppose that a failure has occured at point k (FIG. 4); the breaker at station A trips open and disconnects the power from the whole line. All switches C1, C2, C3 ... Cn open since the respective apparatus have operated as already explained, in describing FIG. 1. As soon as the breaker at the station A recloses, the power first reaches switch C1; this switch in turn, closes after a time delay x and allows the power to reach as far as the switch C2; this switch in turn, after a time delay x, closes and transmits power towards switch C3. The presence of the failure persisting at point k causes again the instantaneous tripping of the main breaker, at the station A, and therefore the voltage is taken off again on the whole line A–B.

According to what has been said above, in describing the apparatus illustrated in FIGS. 1, 2 and 3, disc H and the relevant apparatus of switch C2, is then in the position shown in FIG. 3, locking the switch itself in the open position, while the switch C1, and eventually other that might be connected ahead of the line section wherein the failure k is persisting, do not reopen again. At this time, when from station A power is applied again for the second time, the power will be permanently fed to all the line as far as ahead of switch C2, which, together with the relevant apparatus, will take up again the position shown in FIG. 1; there is thus obtained the supply and normal operation of all said length of line.

At the same time, another known or preferred apparatus whatsoever will have indicated the section where the failure k is persisting, whereby it will be easy to provide for repairing same and placing again the whole line in operation as soon as possible, the interruption having however been limited, just because of the presence of the apparatus being the object of the present invention, in each single disconecting switch.

When line a–b (see FIG. 1) are ring fed at the points a–b, providing a reduction transformer f also on side b of each sectioning point, the operation above described will start simultaneously from side a and b: in this manner there will remain locked in open position sectioning switches C2 and C3, if the failure is therebetween. Disengagement of switches C2 and C3 will be effected by operator after the failure has been removed.

The above described system may be utilized for controlling the opening of any one sectioning switch by behaving in the way as set forth beow:

(1) Take off the voltage from line A–B at the point A and apply it again at once.
(2) Take off the current a second time after has been elapsed a time $nx$ corresponding to the sectioning switch to be opened, switch that upon its opening locks itself.
(3) It is also possible to remote unlatch the sectioning switch by applying to it a second relay-programmer, having the only duty of establishing the contact for an instant, insead of the push-button ps (see FIG. 1).

It is to be noted how, being the opening of each of said interrupting devices C1, C2, C3 ... Cn, controlled by an under-voltage coil, this function is, under normal conditions, punctually effected, while during the time of search for the failure, the function of said undervoltage coils is conditioned by the remotely operating programmer described above, the elements whereof placed in every single interrupting device, are connected to each other by the electric axis constituted by the successive supply points of the single sections.

The apparatus object of the present invention, suitably adapted, may be applied to any other system, for instance using by-pass switches, adapted to connect and disconnect in the circuit, automatically, impedances damping the value of short-circuit loads and the like, while, suitably adapted, the same apparatus may be installed in systems for the progressive re-application of power in an industrial system that has to perform particular working cycles or the like.

After what has been stated, the advantages that the use of the present invention in several forms of application may offer are evident. Of course the constructive and connection details of the elements constituting the apparatus being the object of the invention, may vary according to needs without therefore departing from the field of the invention itself.

What I claim is:

1. A remotely operating programmer, comprising in combination an electric line having a plurality of interrupting devices spaced apart therealong, and separate means for operating each interrupting device to open or close the same, each said means comprising a movable member, motor means for moving said member, means responsive to a failure of voltage in the line adjacent said interrupting device for opening said interrupting device and for actuating said motor to move said member from a first position, means responsive to failure of voltage in the line when said member has been moved by said motor to a second position to lock the interrupting device in open position, said member comprising a rotatable disc having on its perimeter cam means, levers for maintaining closed the interrupting device, a tooth on one of said levers being engageable with one of said cam means on said disc to stop said disc in said first position and engageable with another of said cam means to stop said disc in said second position, an undervoltage relay for maintaining said levers in the position they occupy when the interrupting device is closed, said undervoltage relay being responsive to said failure of voltage to release said levers to permit opening of said interrupting device, a spring urging said levers to the position they occupy when said interrupting device is open, and time delay means connected with said levers to delay their movements.

References Cited

UNITED STATES PATENTS

| | | | |
|---|---|---|---|
| 3,150,287 | 9/1964 | Baldwin | 317—22 |
| 3,139,495 | 6/1964 | Harder | 335—34 |
| 2,942,154 | 6/1960 | Van Ryan | 317—29 |
| 2,269,604 | 1/1942 | Schwager | 335—26 |
| 3,062,990 | 11/1962 | Brown | 317—31 |
| 3,200,209 | 8/1965 | Fitzgerald | 335—73 |

FOREIGN PATENTS 386,684  1/1933  Great Britain.

BERNARD A. GILHEANY, Primary Examiner

D. M. MORGAN, Assistant Examiner

U.S. Cl. X.R.

335—32, 74